(No Model.)

M. A. WALSH.
PROCESS OF CONCENTRATING SULPHURIC ACID.

No. 291,821. Patented Jan. 8, 1884.

Witnesses

Inventor
Moses A. Walsh
By Connolly Bros.
Attorneys

UNITED STATES PATENT OFFICE.

MOSES A. WALSH, OF CAMDEN, NEW JERSEY.

PROCESS OF CONCENTRATING SULPHURIC ACID.

SPECIFICATION forming part of Letters Patent No. 291,821, dated January 8, 1884.

Application filed June 12, 1883. (No specimens.)

*To all whom it may concern:*

Be it known that I, MOSES A. WALSH, a citizen of the United States, residing at Camden, in the county of Camden and State of New Jersey, have invented certain new and useful Improvements in Concentrating Sulphuric Acid; and I do hereby declare the following to be a full, clear, and exact description of the invention, reference being had to the accompanying drawings, which form part of this specification, in which—

Figure 1:
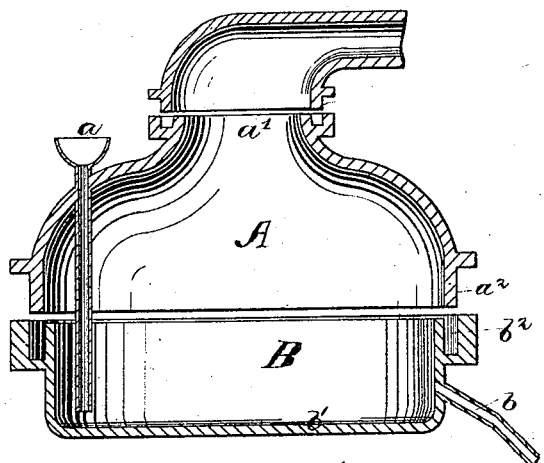
Figure 2:
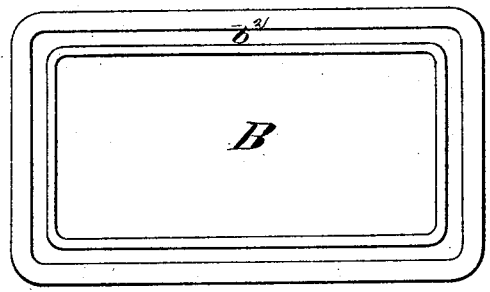

Figure 1 is a vertical section of still, the upper section slightly raised from lower section. Fig. 2 is a plan of lower section of still.

My invention has for its object to provide a method and means for the manufacture of the strongest monohydrate sulphuric acid. The oil of vitriol of commerce consists of 93.5 per cent. monohydrate sulphuric acid and 6.5 per cent. water. All attempts to take out this water by boiling in platinum stills result in such great destruction of the platinum that the production of oil of vitriol containing even ninety-six to ninety-eight per cent. of monohydrate acid is commercially impracticable. The production of the strongest hydrate sulphuric acid has been heretofore attained only by a method so roundabout that its cost in some branches of industry amounts to prohibition. By my invention I produce the strongest monohydrate sulphuric acid, containing eighty to eighty-one per cent. sulphuric anhydride. Cast-iron vessels have often been proposed and used for the last concentration of sulphuric acid. In each case the sulphuric acid was run from the leaden pans into a cast-iron vessel at a strength as great as it is practicable to obtain sulphuric acid in leaden pans, the specific gravity of 1.73 containing 79.5 per cent. only of monohydrate acid, or sixty-five per cent. of sulphuric anhydride. The cast-iron vessels receiving acid containing so much water as this were quickly destroyed and much acid thereby wasted, and the use of cast-iron vessels for concentrating sulphuric acid had to be abandoned in consequence of this destruction and waste. Taking advantage of the fact that iron and steel are scarcely affected by boiling sulphuric acid containing 93.5 per cent. monohydrate acid, and being aware that boiling sulphuric acid containing more than 93.5 per cent. of monohydrate acid is very destructive to platinum vessels, and the more destructive the more it approaches to the pure monohydrate, I take the sulphuric acid which has been concentrated to 93.5 per cent. and run it while hot into an iron or steel vessel, in which I concentrate it to the degree of monohydrate acid. The distillate from the iron vessel is made to contain 93.5 per cent. $H_2SO_4$, while the acid running from the bottom is the required monohydrate. I work the iron or steel still by continuous process—that is, the acid as it runs from a vessel or still in which it has been concentrated to 93.5 per cent. monohydrate acid, instead of being cooled in the usual way, is made to run into such iron or steel still, and as it runs from this it is then cooled in the usual way.

The still may be of any usual or proper form for carrying the described process of concentration into effect; but I prefer a still of the following construction, which forms the second part of my invention.

Referring to the accompanying drawings, A indicates the upper and B the lower section of a chamber, which is composed of iron or steel, and preferably of cast-iron. The upper section, A, has an inlet, $a$, for the admission of acid, a neck-opening, $a'$, for the escape of gases and vapor, and has an annular flange, $a^2$, around its lower edge. The lower section, B, has a discharge-opening, $b$, near its bottom $b'$, and an annular trough, $b^2$, around its upper edge, into which trough the lower edge of the upper section, A, enters, the joint being luted with sulphur or any equivalent material to prevent the escape of fumes.

I do not claim as my invention the application of iron for concentrating sulpuric acid, nor do I in this application claim the special still which I have described, and I therefore reserve the right and privilege of making the still the subject of a separate application; but

What I claim as my invention is—

The method of making monohydrated sulphuric acid by first concentrating in the usual way till the acid contains about ninety-three per cent. of monohydrated acid, and then transferring it to iron or steel vessels, in which the concentration is completed.

In testimony that I claim the foregoing I have hereunto set my hand this 8th day of June, 1883.

MOSES A. WALSH.

Witnesses:
 ANDREW ZANE, Jr.,
 WM. H. POWELL.